Patented Oct. 25, 1932

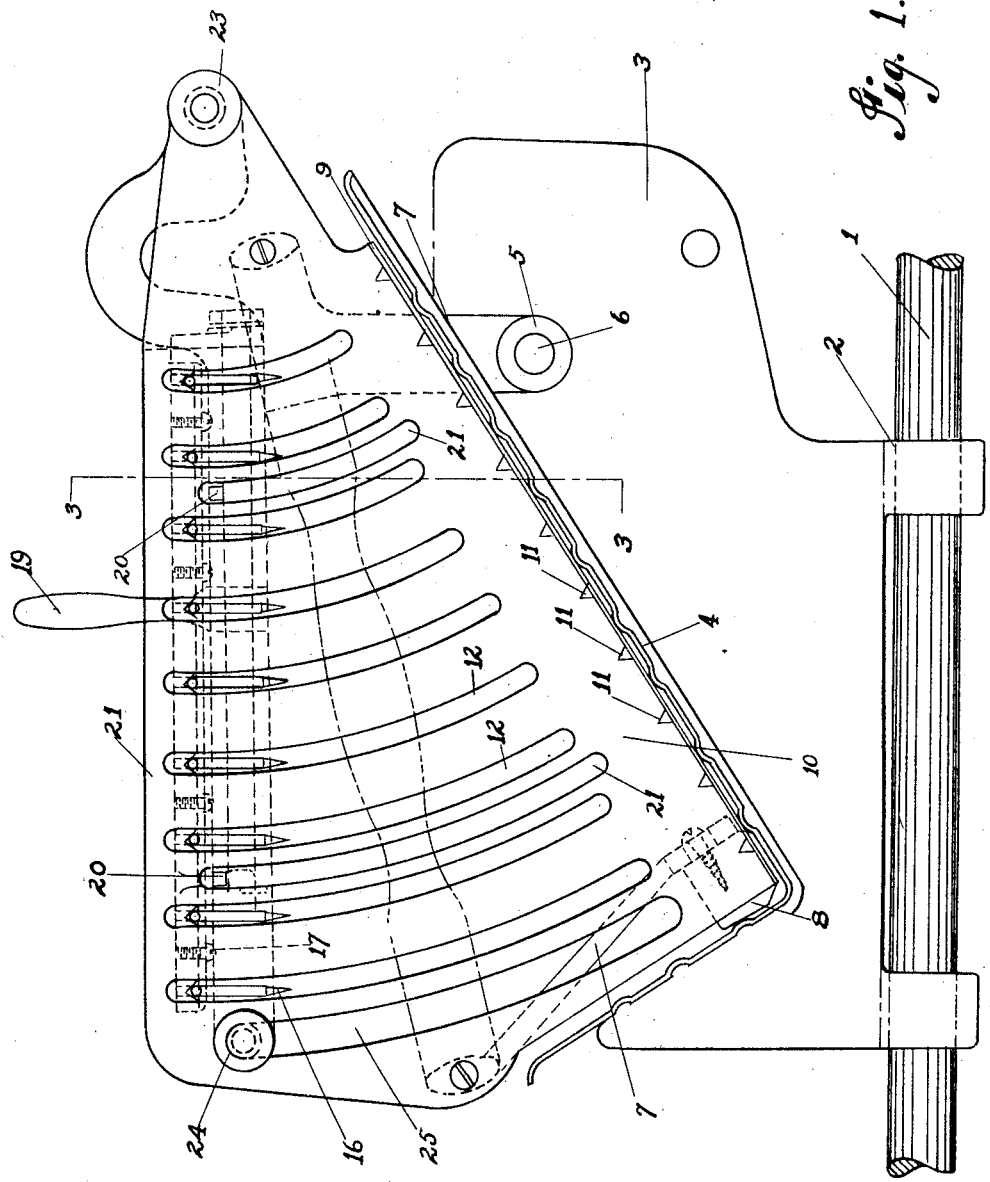

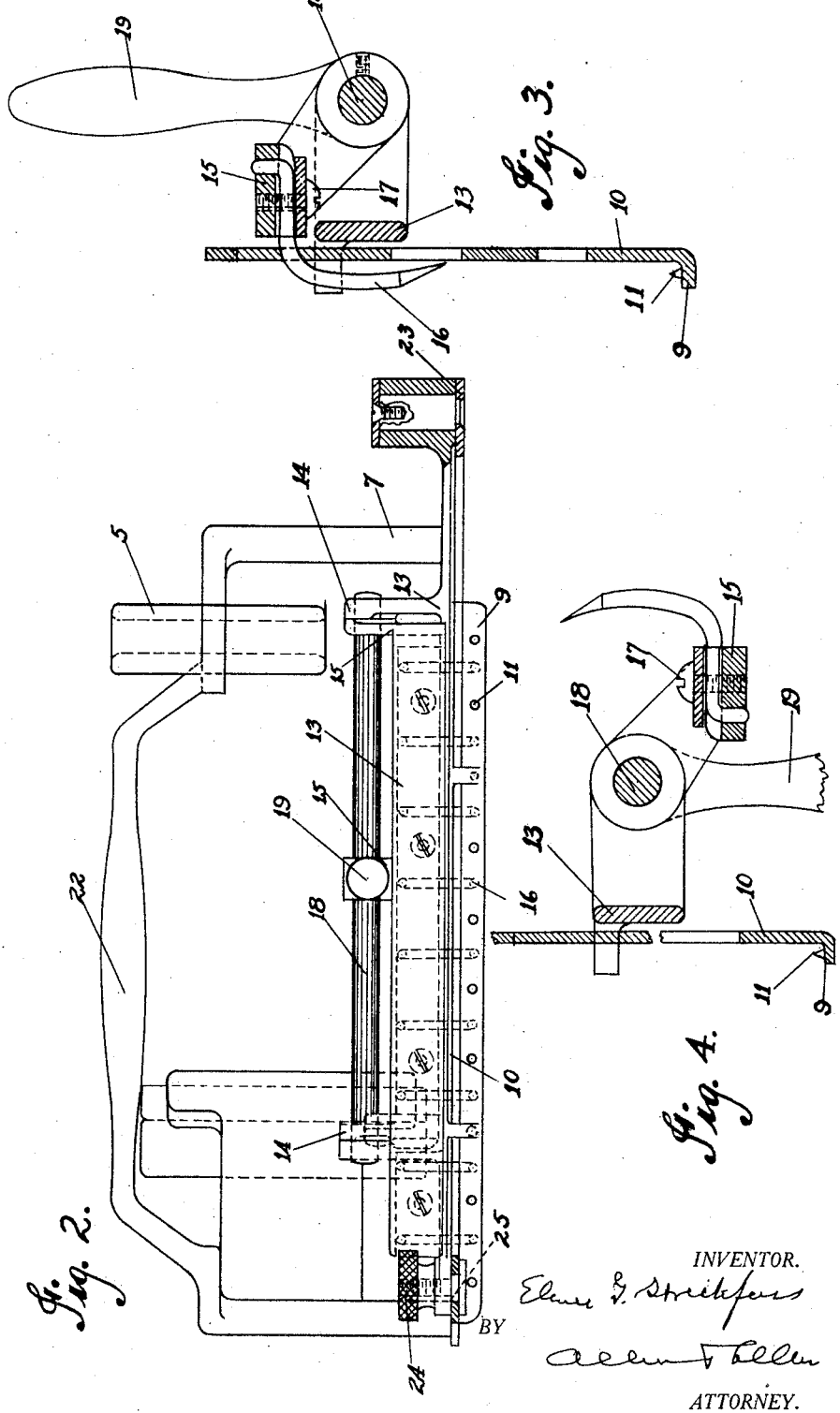

1,884,351

UNITED STATES PATENT OFFICE

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO

MEAT CLAMP

Application filed November 18, 1929. Serial No. 407,843.

My invention relates to end slice meat clamps for use in connection with the securing of end pieces of meat upon the feed table of a meat slicing machine.

In the art it has been proposed to provide an end slice clamp with tines which are movable from above to pierce the meat and with projections extending up from below to cooperate with the movable tines. Such combinations require a complete piercing of the meat, stripper members and guide members to hold the tines in alignment so that they will descend vertically into the meat. The complete piercing of the meat is undesirable and the points of the tines are liable to come into contact with the rotating cutting knife.

It is the object of my invention to provide in combination with a backing plate, a tine carrying plate movable relatively to the backing plate which can be so manipulated that the tines may be moved into meat gripping position at any desired position, and which obviates the necessity of meat strippers or guides for the tines. It is further an object to provide such an end grip with a supporting plate on which a round slice of meat will not have any tendency to roll.

The above and other objects, such as cheapness in construction, sturdiness and ease of cleaning, to which reference will be made in the ensuing description, I accomplish by that certain combination and arrangement of parts of which I have shown a preferred modification.

Referring to the drawings:—

Figure 1 is a front elevation of a preferred type of end grip clamp.

Figure 2 is a plan view of the clamp shown in Figure 1.

Figure 3 is a fragmentary sectional view taken along the lines 3—3 in Figure 1.

Figure 4 is a sectional view similar to that shown in Figure 3 with the tines withdrawn.

I have indicated guide bars 1 which it will be understood form part of the frame of the meat slicer. The carriage which slides back and forth on the guide bars has bosses 2 and a frame 3 in which is mounted the meat supporting plate 4. The meat plate is preferably of angular shape with one gradually inclined side and one side inclined more abruptly. The end grip or clamp has a supporting sleeve 5 which engages a slide bar 6 on the carriage and enables the end grip to be moved along the supporting tray toward the knife. A bracket 7 connects the sleeve with a block 8 which slides along the tray in the lowermost angular corner thereof. The bracket 7 extends as indicated toward the high end of the end grip where it supports the high end of the outwardly flanged portion 9 of the backing plate 10. The lower flanged edge of the backing plate conforms to the shape of the tray so that it will slide readily along on the tray. At spaced intervals short tines 11 or projections extend up from the flanged edge of the backing plate.

The backing plate has arcuate slots 12 in it which allows for movement of the tine carrying frame 13. The frame 13 has bosses 14 formed therein. Pivotally mounted brackets 15 carry the curved tines 16 which may be secured in the brackets with screws 17. The tine supporting brackets are fixed on a shaft 18 having a handle 19 and journaled in the bosses 14 extending from the frame 13.

The frame member 13 has extensions 20 movable in slots 21 in the backing plate, which limit the downward movement of the tine carrying frame when the handle portion 22 is lowered to bring the frame down into position to engage the meat. The frame 13 is journaled in a boss 23 extending from the backing plate 10.

The end grip is ordinarily used only when an end slice has become so thin that it cannot be advanced manually. Then the piece of meat is placed in the lower angular corner of the outwardly flanged portion 9 with such tines 11 penetrating the meat as its shape will warrant.

The thumb nut 24, which slides in an arcuate slot 25 in the backing plate, may then be tightened and the slice will be held firmly until it is cut as thin as is practical. The handle 21 is then lowered until the extensions 20 abut the meat. The members 20 thus act as gauges to indicate a suitable position for bringing the pivoted tines into use to grip the top of the meat. The handle 19 is then rotated and the tines sink into the meat and tend to pull it back against the backing plate with the points of the tines extending within the slots 12.

When it is desired to release the end slice, the handle 19 is moved from the position shown in Figure 3 to the position shown in Figure 4, and the backing plate then acts to prevent the meat being carried up with the tines.

Having thus described my invention, what I claim as new and desire to secure by Letters Patent, is:—

1. An end grip for a meat slicer having a movable tray carriage comprising a frame movably mounted on said carriage, a backing plate having an inturned flanged base with spaced projections therein, said plate having arcuate slots therein, a pivoted member movable in the arc of said slots, and means for pivotally mounting curved tines spaced proportionately to said arcuate slots on said pivoted member.

2. An end grip for a meat slicer having a movable tray carriage comprising a frame movably mounted on said carriage, a backing plate having an inturned flanged base with spaced projections therein, said plate having arcuate slots therein, a pivoted member movable in the arc of said slots, means for pivotally mounting curved tines spaced proportionately to said arcuate slots on said pivoted member, and means for pivoting said tines to extend said tines through said slots.

3. An end grip for a meat slicer having a movable tray carriage comprising a frame movably mounted on said carriage, a backing plate having an inturned flanged base with spaced projections therein, said plate having arcuate slots therein, a pivoted member movable in the arc of said slots, means for pivotally mounting curved tines spaced proportionately to said arcuate slots on said pivoted member, means for pivoting said tines to extend said tines through said slots, and means for gauging the position of said pivoted member relative to meat to be sliced.

4. An end grip for a meat slicer having a movable tray carriage comprising a frame movably mounted on said carriage, a backing plate having an inturned flanged base with spaced projections therein, said plate having arcuate slots therein, a pivoted member movable in the arc of said slots, means for pivotally mounting curved tines spaced proportionately to said arcuate slots on said pivoted member, means for pivoting said tines to extend said tines through said slots, and means for gauging the position of said pivoted member relative to meat to be sliced, and for setting said member in gauged position.

5. End slice gripping mechanism for a meat slicer comprising a backing plate having arcuate slots therein, a member pivoted for movement in the arc of said slots, and means for pivotally mounting curved tines on said member.

ELMER G. STRECKFUSS.